3,483,259
NEGATIVE ELECTRODE AND ELECTROCHEMICAL BATTERY CONTAINING SAME
Harvey N. Seiger, East Brunswick, and Paul F. Ritterman, Scotch Plains, N.J., assignors to Gulton Industries, Inc., a corporation of New Jersey
No Drawing. Filed July 27, 1967, Ser. No. 656,338
Int. Cl. H01m 43/04
U.S. Cl. 136—6                    8 Claims

ABSTRACT OF THE DISCLOSURE

Negative electrodes for use in rechargeable electrochemical batteries, particularly of the silver-cadmium type, in which there is pressed onto a metal grid, under substantial pressure, a mixture of cadmium oxide and cadmium hydroxide in a weight ratio of about 1:1 to about 3:1 of cadmium oxide to cadmium hydroxide, said mixture also advantageously including from about 1% to about 10% of powdered nickel and/or powdered silver. The said electrodes are utilized in rechargeable electrochemical batteries containing positive electrodes, notably those containing silver as an active material, and an alkaline electrolyte.

---

The present invention is directed to the field of rechargeable electrochemical batteries, particularly of the so-called silver-cadmium type, and to improve negative electrodes having particular utility for use in such batteries.

Rechargeable batteries of the foregoing type have been known for some period of time. In general, they comprise positive electrodes alternating with negative electrodes, said positive and negative electrodes being separated from each other by separators, an alkaline electrolyte, such as sodium hydroxide or potassium hydroxide, being appropriately disposed in the battery casing, commonly being absorbed into a porous carrier or separator.

It has heretofore been known, as disclosed in U.S. Patent No. 2,994,729, to produce negative electrodes, for use in electrochemical batteries in which the positive electrode or electrodes include silver as an active material, by forming a mixture of finely powdered cadmium oxide with a minor amount of silver powder, and particularly desirably with a minor amount of a binder such as an aqueous solution of polyvinyl alcohol, and allowing said mixture to dry, and then pressing said mixture onto a silver grid, pressures ranging between about 0.75 to 3 tons per cm.² being utilized. In cycling, the cadmium oxide, in the discharged state of the batteries, is partly converted into cadmium hydroxide. The resulting electrode is then utilized as the negative electrode in the electrochemical batteries and charged prior to use.

Negative electrodes made in accordance with the aforesaid Patent No. 2,994,729 are in commercial use. However, as commercially manufactured, tissue paper is used as a support on both sides of the negative electrode in order that said electrode have and retain adequate structural integrity.

It has also heretofore been known to produce negative electrodes by procedures which involve impregnating a porous plaque or grid, for instance, a porous nickel plaque, with a solution of a cadmium salt, such as cadmium nitrate or cadmium chloride, and subsequently thermally decomposing the impregnated cadmium nitrate to cadmium oxide, or precipitating cadmium hydroxide within the pores by means of sodium hydroxide; and, prior to use in the battery or cell, preferably converting the cadmium oxide to cadmium hydroxide electrolytically in a potassium hydroxide electrolyte bath, as disclosed in U.S. Patents Nos. 3,002,041 and 3,057,942. Furthermore, it has been suggested to prepare negative electrodes by filling the pockets of perforated nickel plates with cadmium oxide or cadmium hydroxide mixed with minor percentages of finely divided metallic iron and ferrous oxide to which a small amount of latex is added, as shown in U.S. Patents Nos. 2,727,080 and 3,023,258.

None of the foregoing procedures is effective to achieve the advantages which are brought about by the practice of the present invention.

In accordance with the present invention, it has been found that marked advantages are achieved in negative electrodes, and in rechargeable electrochemical batteries utilizing said negative electrodes, if there are initially incorporated into said electrode, prior to any cycling, a mixture containing substantial proportions of both cadmium oxide and cadmium hydroxide, followed by pressing said mixture onto metal grids or similar support under substantial pressure. These advantages center about the unexpectedly enhanced compressibility which results from the conjoint use of cadmium oxide and cadmium hydroxide which enables the production of negative electrodes of greater density and which yield a higher energy per unit volume. The structural integrity of the negative electrodes of the present invention is such that extraneous support, such as the aforementioned tissue paper which is used in connection with the commercial embodiment of the aforesaid U.S. Patent No. 2,994,729, is unnecessary. The greater structural strength of negative electrodes made pursuant to the present invention simplifies the problem of handling of electrodes. Furthermore, the avoidance of the necessity for the use of tissue paper supports enables negative plates of lesser overall thickness to be utilized, thus reducing thicknesses by of the order of about 0.007 inch which is the approximate thickness of two sheets of tissue paper of the type used as supports as referred to above.

The previously mentioned enhanced compressibility characteristics involved in the production of the negative electrodes of the present invention enable the production of negative electrodes of materially lesser thicknesses using the same weight of negative electrode material pressed onto the same area grid. Thus, by way of illustration, a given weight of negative electrode material will produce a negative electrode, of a given area, of a thickness of 0.028 to 0.032 inch, in contrast to a negative electrode having a thickness of from 0.048 to 0.052 inch utilizing same weight of negative electrode material and the same area grid when following the procedures disclosed in U.S. Patent No. 2,994,729. The compactness of said negative electrodes allows for more room for its antipodes, be they silver oxide, nickel hydroxide or any suitable cathode material. The foregoing factors enable one to incorporate, into a given volume of space, more negative plates of the type produced in accordance with the present invention and, thus, produce an electrochemical battery with a greater capacity for a given size of battery. This is illustrated by a silver-cadmium type of battery of a given size, made in accordance with the disclosure of Patent No. 2,994,729, which yielded 15 to 16 ampere hours; as against a yield of 17.5 to 20 ampere hours in an otherwise the same size and same type of cell but utilizing negative electrodes, and a greater number of them, made in accordance with the present invention. Expressed mechanically, typical or illustrative negative electrodes made in accordance with the present invention yield 0.80 ah./cc. of negative plate, as against a yield of 0.56 ah./cc. of a negative plate made pursuant to the aforesaid Patent No. 2,994,729.

As stated previously, for the achievement of the results of the present invention, the use of a mixture of both cadmium oxide and cadmium hydroxide is essential, each being utilized in substantial proportions, and said mixture must be pressed onto a metal grid or similar support under substantial pressure. The cadmium oxide and cadmium hydroxide are used in a weight ratio of about 1:1 to about 3:1 of cadmium oxide to cadmium hydroxide. There is nothing critical about the weight of the metal grid or similar support but, since it represents inactive material, it is desirable to keep it as low as is reasonably possible and, accordingly, it should desirably not exceed about 5% of the weight of the finished negative electrode and is advantageously in the range of from 2% to 4%.

The pressures at which the cadmium oxide-cadmium hydroxide containing mixture is pressed onto the metal grid or like support are somewhat variable but, in general, should be at least about 1 ton/in.$^2$ and need not exceed about 10 tons/in.$^2$, better still about 3 to 7 tons/in.$^2$ and with a good average being about 5 tons/in.$^2$. Negative electrode thicknesses are variable but it is particularly preferred, for many uses, that the thicknesses fall within the range of about 0.020 to 0.040 inch, and better still within the range of 0.028 to 0.032 inch.

In the manufacture of the negative electrodes of the present invention, the cadmium oxide and the cadmium hydroxide may be admixed with a small percentage of a binder prior to pressing the mixture on the metal grid. However, no binder is necessary and it is advantageously omitted. Where, however, a binder is employed, it may be polyvinyl alcohol or other known thermoplastic binders and it may be utilized in quite small proportions as, for instance 0.2% to 1% by weight of the mixture containing the cadmium oxide and cadmium hydroxide.

To reduce the resistance of the electrochemical batteries made with the negative electrodes of the present invention, it is advantageous to incorporate with the mixture of the cadmium oxide and the cadmium hydroxide, prior to the pressing thereof onto the metal grid, a small percentage of a powdered or pulverulent metal of good electrical conductivity. It is preferred to use silver powder for this purpose but other metals of reasonably good electrical conductivity can be used in place of or together with the silver powder, for instance, nickel powder, or other finely divided metals of a type which will not adversely or unduly adversely affect the operation of the electrochemical batteries using the negative electrodes of the present invention. The range of percentages of such finely divided electrically conductive metals is variable but will generally range from about 1% to about 10% by weight of the negative electrode, with a preferred range being from 3% to 7%, and about 5% being a good average.

It is particularly advantageous to use a silver grid or support for the pressed on cadmium oxide-cadmium hydroxide containing mixture. However, other suitable metal grids or supports can be used as, for instance, nickel amalgams, iron amalgams and the like.

The following example is illustrative of the production of negative electrodes pursuant to the present invention and it is not to be construed as limitative of the invention since, obviously, various changes can be made in the light of the guiding principles and teachings provided herein.

Example

Equal parts by weight of powdered cadmium oxide and cadmium hydroxide are mixed together with silver powder to provide a homogeneous mixture, the silver powder constituting 5% by weight of the mixture. The said mixture is then pressed onto the opposite sides of a silver grid at a pressure of 5 tons/in.$^2$ to produce a smooth body of excellent structural strength. The silver grid constituted about 3% of the weight of the negative electrode. The said electrodes had a thickness of approximately 0.030 inch.

In general, the negative electrodes of this invention can be incorporated directly into the electrochemical battery with the positive electrodes and electrolyte without the necessity for any prior cycling. However, in certain instances, prior cycling may be desirable although, as indicated, this is generally optional.

No novelty is claimed in any particular structure or arrangement of the electrodes in the electrochemical batteries. The negative electrodes of the present invention can be utilized as the negative electrodes in batteries of variable construction as, for instance, such as are disclosed in U.S. Patent No. 2,994,729, as well as in U.S. Patents Nos. 2,379,374; 2,527,888; 2,571,927 and 2,636,058. They are of particular utility in electrochemical batteries of the silver-cadmium type, but are also useful as the negative electrode in other batteries such as those of the nickel-cadmium type, and in vented as well as sealed batteries.

We claim:

1. A negative electrode having particular utility for use in electrochemical batteries of the silver-cadmium type comprising a metal grid upon which there is supported a compacted comminuted mixture containing, as essential ingredients, cadmium oxide and cadmium hydroxide in a weight ratio of from about 1:1 to about 3:1 of cadmium oxide to cadmium hydroxide, said mixture constituting not substantially less than 90%, by weight, of said negative electrode.

2. A negative electrode according to claim 1, in which said compacted comminuted mixture includes powdered nickel and/or powdered silver in amount in the range of about 1 to about 10% by weight of said mixture.

3. A negative electrode according to claim 1, in which the metal grid is silver.

4. A negative electrode according to claim 2, in which the compaction of said comminuted mixture is effected under a pressure of from about 3 to about 7 tons per square inch, said negative electrode having a thickness of about 0.028 to about 0.032 inch.

5. A rechargeable electrochemical battery which includes (a) at least one positive electrode which includes silver as an active material, (b) a negative electrode comprising a metal grid upon which there is supported a compacted comminuted mixture containing, as essential ingredients, cadmium oxide and cadmium hydroxide in a weight ratio of from about 1:1 to about 3:1 of cadmium oxide to cadmium hydroxide, said mixture constituting not substantially less than 90%, by weight, of said negative electrode, and (c) an alkaline electrolyte.

6. An electrochemical battery according to claim 5, in which said compacted comminuted mixture includes powdered nickel and/or powdered silver in amount in the range of about 1 to about 10% by weight of said mixture.

7. An electrochemical battery according to claim 6, in which there are several positive electrodes and several negative electrodes, and wherein the compaction of said comminuted mixture is effected under a pressure of from about 3 to about 7 tons per square inch, said negative electrode having a thickness of about 0.028 to about 0.032 inch.

8. An electrochemical battery according to claim 7, in which the metal grid is silver.

(References on following page)

References Cited

UNITED STATES PATENTS

| | | | |
|---|---|---|---|
| 2,820,078 | 1/1958 | Salauze | 136—24 |
| 2,870,234 | 1/1959 | Moulton | 136—24 |
| 2,994,729 | 8/1961 | Solomon et al. | 136—24 |
| 3,024,296 | 3/1962 | Adler | 136—24 |
| 3,208,880 | 9/1965 | Bode | 136—24 |
| 3,326,721 | 6/1967 | Henderson et al. | 136—24 |

WINSTON A. DOUGLAS, Primary Examiner

C. F. LEFEVOUR, Assistant Examiner

U.S. Cl. X.R.

136—20, 24